United States Patent
Vanmeenen et al.

(10) Patent No.: US 6,241,082 B1
(45) Date of Patent: Jun. 5, 2001

(54) CONVEYOR FOR USE IN THE AUTOMOTIVE INDUSTRY

(75) Inventors: Freddy Vanmeenen, Mouscron (BE); Anseim Filliger, Ennetmoos (CH)

(73) Assignee: Cersa N.V. Societe Anonyme, Mouscron (BE)

( * ) Notice: Subject to any disclaimer, the term of this patent is extended or adjusted under 35 U.S.C. 154(b) by 0 days.

(21) Appl. No.: 09/340,744

(22) Filed: Jun. 28, 1999

(51) Int. Cl.$^7$ ........................................... B61B 3/00
(52) U.S. Cl. .................. 198/845; 198/678.1; 198/687; 104/89
(58) Field of Search .................. 198/678.1, 686, 198/687, 845; 104/89, 93–95; 105/150, 151, 155, 148

(56) References Cited

U.S. PATENT DOCUMENTS

| | | | |
|---|---|---|---|
| 1,576,924 | * 3/1926 | Malloy | 152/379.3 |
| 1,906,097 | * 4/1933 | Pribel | 198/687 |
| 2,633,226 | * 3/1953 | Vogt | 198/686 |
| 3,051,011 | * 8/1962 | Zebley | 198/686 |
| 3,127,006 | * 3/1964 | Tochtermann et al. | 198/686 |
| 3,139,175 | * 6/1964 | Wlees | 198/686 |
| 4,049,308 | * 9/1977 | Martin | 198/845 |
| 4,199,052 | * 4/1980 | Morris | 198/845 |
| 4,210,238 | * 7/1980 | Frost et al. | 198/687 |
| 4,228,738 | * 10/1980 | Forsee | 198/687 |
| 4,262,796 | * 4/1981 | McDonald | 198/687 |
| 4,433,627 | * 2/1984 | Forsee | 198/687 |
| 4,484,525 | * 11/1984 | Forsee et al. | 198/687 |
| 5,839,371 | * 11/1998 | Knuttel | 198/686 |

FOREIGN PATENT DOCUMENTS

| | | | |
|---|---|---|---|
| 600706 | * 6/1960 | (CA) | 198/686 |
| 1544519 | * 4/1979 | (DE) | 198/687 |
| 567295 | * 10/1993 | (EP) | 198/678.1 |

* cited by examiner

Primary Examiner—Eileen D. Lillis
Assistant Examiner—Paul T. Chin
(74) Attorney, Agent, or Firm—Harrison & Egbert

(57) ABSTRACT

A conveyor intended to conduct components to different work stations, the conveyor including:
  a bearing and guide rail positioned on the work site so as to conduct the products to be conveyed to the work stations,
  a traction member carried by the rail the member being driven by a drive unit, and
  a multitude of trolleys movable on the rail and to which the components are attached, each trolley having two wheels running on the rail and two arms bearing the load to be conveyed.

The wheels of the trolley include a central core and an outer band both made of composite material and positively connected by fixing element which immobilize the outer band with respect to the central core in order to absorb tensile or compressive stresses and shocks, thereby reducing the noise, wear and lubrication of the elements of the conveyor.

2 Claims, 4 Drawing Sheets

CONVEYOR FOR USE IN THE AUTOMOTIVE INDUSTRY

TECHNICAL FIELD

The invention relates to a conveyor used, in particular, in the automotive industry to convey and conduct car bodies, engines or gearboxes to the work stations for the manufacture thereof or for the assembly of the different components of the cars. It is also to be used in any type of industry where it is necessary to convey large numbers of components.

BACKGROUND ART

It has long since been known to use conveyors to transport large numbers of heavy automobile components over very long distances in order to move them to work stations. These conveyors can be overhead conveyors or can be positioned on the ground depending on the operations to be carried out on the products.

The conveyors consist of a rail, a drive chain and trolleys. The rail often has an I-shaped section and forms the path to be followed by the components to be conveyed. A drive unit drives the chain, which is connected to the trolleys, themselves transporting the products. The drive unit must be capable of pulling a total load the weight of which varies, e.g. from one hundred to three thousand kilograms.

The trolley for its part consists of two wheels and two arms and a wedge the thickness of which allows the ends of the two arms to be held in position inside a link of the chain. The arms of the trolleys support the load which is suspended from the rail in the case of an overhead conveyor or rests on the rail in the case of a conveyor positioned on the ground.

Each arm of the trolley is provided at its end with a wheel pivoted by means of a ball bearing, the wheels bearing against the rail on either side thereof.

All of the elements making up the conveyor, i.e. the rail, trolley and chain, are made of steel, thereby creating considerable at the work site, as the different elements of the conveyor are constantly subjected to tensile or compressive stresses, shocks and friction between the steel elements, thereby amplifying the already high decibels given the noise of the production machines and the drive motors of the chain of the conveyor.

These noises due to shocks and friction of the trolleys with the rail and the chain are highly amplified by the fact that the rail is of quite a considerable length, reaching, on average, one hundred to one thousand metres per conveyor, and that the number of trolleys positioned on the rail is also high as the trolleys are spaced apart at an average distance of three hundred to one thousand millimeters.

With this level of noise, it is therefore common to find employees complaining of hearing problems and headaches.

As the products are moved, those directed by the rail follow a variable path consisting of a series of turns, straight lines, slopes and gradients and are also subjected to a series of acceleration and deceleration operations depending on whether or not the components are situated in a work zone. To this end, the wheels in contact with the rail are subjected to tensile and compressive stresses which cause considerable friction and shocks of the wheels on the rail, both made of steel, and therefore considerable wear of the two elements.

The wheels in contact with the rail must therefore be lubricated in order to reduce this wear and stoppages of the production line in order to repair certain elements of the conveyor. This lubrication is in addition effected in a considerable quantity given the kilometers of conveyor found on the work site.

However, in spite of this lubrication, the rail is still subject to considerable wear, which can reach approximately one centimeter after a few years, meaning that the rails generally have to be changed every four to five years at the vertical and horizontal curves.

During the operation of the conveyor, the arms of the trolleys are also subjected to tensile and compressive stresses as the chain works on the ends of the arms, thereby causing shocks of the wheels on the rail and in the chain and thus further increasing the noise and wear of the elements of the conveyor.

In addition, the moving chain under tension is subjected to considerable friction at the pins and links, which thus wear out very rapidly, meaning that the chain has to be changed frequently and the chain lubricated liberally. An average of two hundred liters of lubricating oil is therefore used per month for approximately five or six conveyors several kilometers in length.

Some conveyors on the work site are situated in a humid environment which in time shocks and wear, leading to corrosion spreading to the work site and, more precisely to the products to be conveyed. This is the reason that, corrosion spots are often found on car bodies when the latter are painted.

In addition, this corrosion and the liberal lubrication of the conveyor take place on site, i.e. on the products, making the working conditions and environment very unpleasant.

This invention aims to obviate all of these disadvantages and one of the objects is to reduce the noise, lubrication and wear of the conveyor by using a trolley made of composite material, designed to withstand tensile and compressive stresses and to limit shocks onto the wheels on the rail and at the chain.

Therefore, one advantage of this invention is that it reduces shocks and friction of the wheels on the rail of the conveyor by absorbing the stresses applied to the wheel in the event of variations in course and variations in speed.

The rail and the wheel are thus subject to virtually no wear and lubrication of the wheels at the rail can be dispensed with completely.

Another advantage of this invention is that it is possible to increase and vary the speed and the conveying of the components in the "dead zones", i.e. where there is no work to be carried out on the products, by virtue of the absorption of stresses on the wheel, as the wheels in contact with the rail have the advantage that they are deformed easily in the event of a variation in speed and direction and can thus withstand stresses and shocks so that the speed of displacement of the trolleys can be increased in the zones where there is no work to be carried out on the components.

This invention also uses arms made of composite material with a particular structure to withstand tensile and compressive stresses and thereby dampen shocks of the wheels on the rail and shocks on the drive chain. This also reduces the noise and wear of the elements of the conveyor.

The reduction of all shocks and the use of composite material for the wheel and the arm virtually eliminates noise during operation. The noise is thus reduced by ten decibels compared to existing conveyors with elements made of steel.

Another advantage of this invention is that it reduces the weight of the conveyor by using trolleys made of composite material instead of steel. This reduction in weight reduces the tensile stresses on the chain, thereby extending its service life, and also allows for the use of smaller drive units as the load to be pulled is smaller.

Another advantage of this invention, combined with the reduction in tensile stresses and shocks of the chain, is to reduce the wear of the chain and, more particularly, of the pins and links of the chain by increasing the mechanical properties of the pins.

This therefore increases the service life of the chain and the quantity of lubricating oil and the frequency of lubrication of the latter can be reduced, thus making it easier to control the maintenance operations of the facility.

Other objects and advantages of this invention will be clear from the following description given purely by way of a non-limiting example.

SUMMARY OF THE INVENTION

The present invention is a conveyor intended to move components to different work stations, for use, in particular, in the automotive industry to convey vehicle bodies, engines and gearboxes. The conveyor comprises.

- a bearing and guide rail positioned on the work site so as to move the products to be conveyed to the work stations,
- a traction member carried by the rail, the member being driven by means of a drive unit, and
- a multitude of trolleys movable on the rail and to which the components are attached, each trolley comprising two wheels running on the rail and two arms bearing the load to be conveyed, characterised in that the wheels of the trolley includes of a central core and an outer band both made of composite material and positively connected by means of fixing means which immobilize the band with respect to the central core in order to absorb tensile or compressive stresses and shocks, thereby reducing the noise, wear and lubrication of the elements of the conveyor.

BRIEF DESCRIPTION OF THE DRAWING

The invention will be more readily understood from the following description with reference to the accompanying drawings, in which.

DETAILED DESCRIPTION OF THE INVENTION

Figure 1:
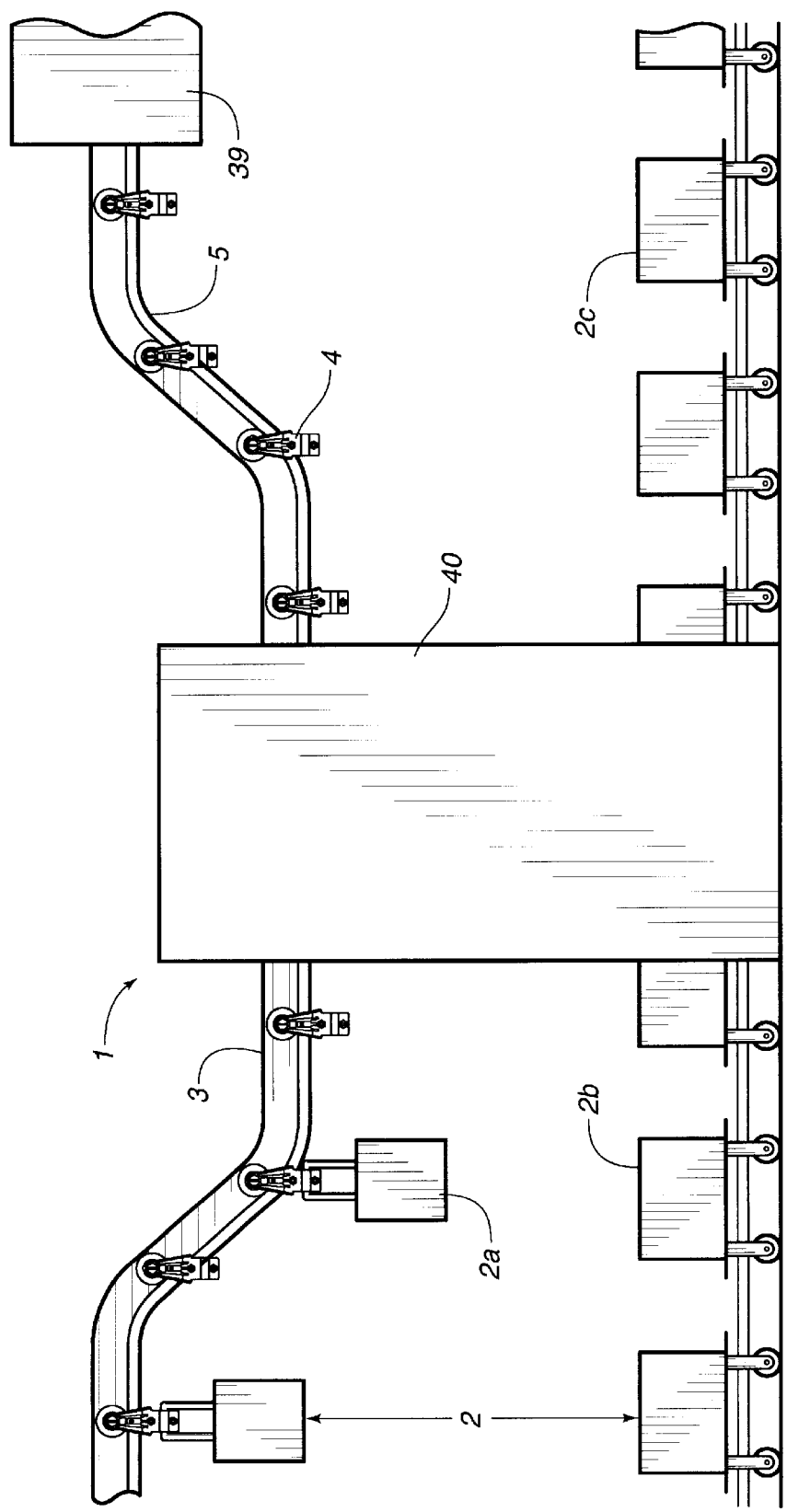
FIG. 1 is a view of the entire conveyor situated on the work site.

This invention relates to a conveyor (1) for use, in particular, in the automotive industry to move products (2) of the vehicle body, engine or gearbox type and to transport them to the work stations as shown in diagrammatic form in FIG. 1. It can be seen that two products of types (2a) and (2b) are conducted to a work station (40) in order to obtain, after conversion, a product of type (2c). It is also to be used in any type of industry where it is necessary to convey large numbers of components generally of considerable weight.

The conveyors (1) can be overhead conveyors, i.e. suspended vertically from the structure of the buildings, or positioned on the ground or in a pit so that the products (2) are positioned level with the ground.

Figure 3:
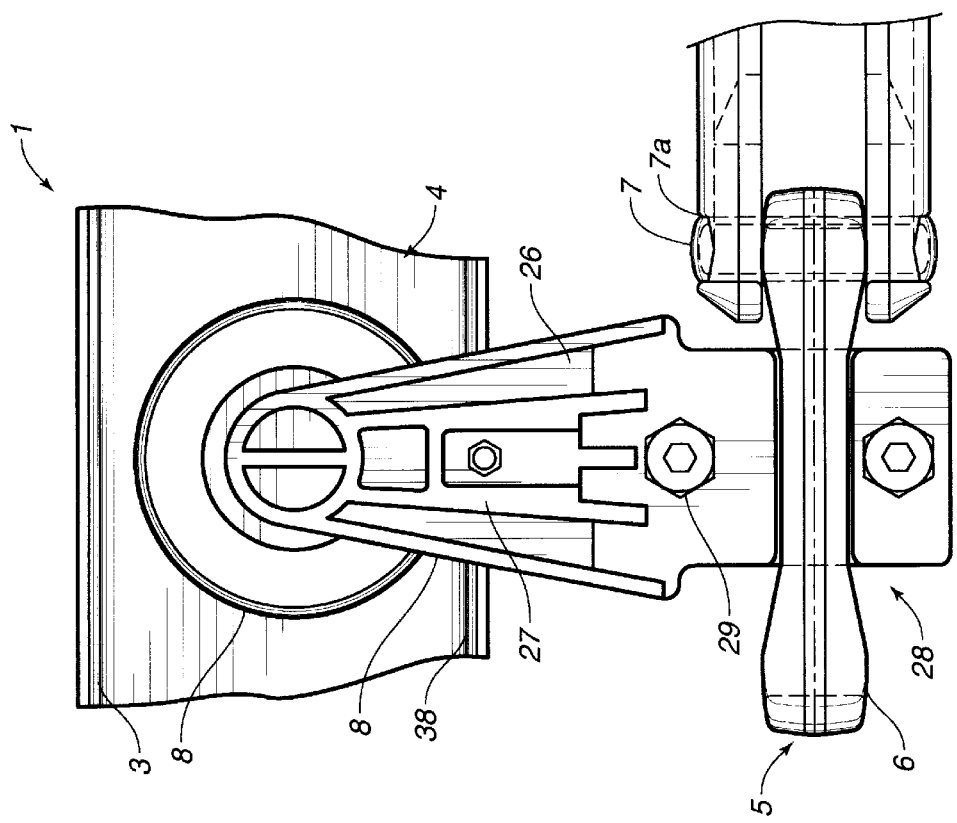
FIG. 3 is a side view of FIG. 1 showing the reinforcing lugs.
Figure 2:
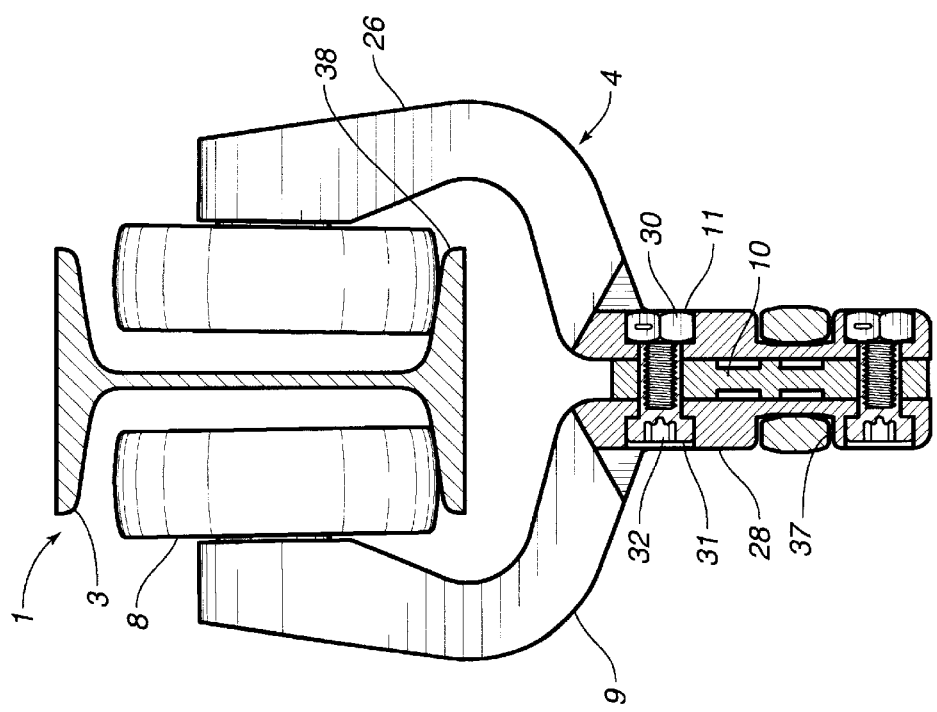
FIG. 2 shows the various elements making up the conveyor.

FIGS. 2 and 3 show the elements making up the conveyor (1). The latter includes a rail (3), a traction member (5) and trolleys (4). In a first case, when the total load to be pulled has a weight, e.g. greater than one hundred kilograms, the traction member (5) used is a drive chain.

The chain (5) is driven by means of a drive unit, shown in diagrammatic form in FIG. 1 and designated (39), allowing the products (2) to be displaced along the rail and advanced to the work stations. The rail (3) is preferably made of steel and has an I-shaped section, the dimensions of which depend on the dimensions of the trolleys (4) in contact therewith. The dimensions of the trolleys themselves depend on the weight of the components to be transported.

The rail can reach an average length of several kilometers and its position on the work site depends on that of each of the work stations to which it is necessary to move the products in order to carry out operations thereon, e.g. the machining, assembly or painting.

The drive chain (5) is also preferably made of steel. It includes links (6) connected together by means of pins (7). The length of the chain depends on the length of the conveyor. The latter is connected to a high-power drive unit (39) which draws it and automatically effects displacement of the trolleys (4) and therefore of the products (2). It is lubricated by means of a lubricating device in order to limit the wear of the pins (7) and the links (6) of the chain.

The trolleys (4) include of two running wheels (8), two arms (9) and a wedge (10). The two arms (9) are positioned in a link (6) of the chain (5) and are held apart in the interior of the latter by means of the wedge (10), the thickness of which depends on the width of the link and on the thickness of the arms. The two arms (9) and the wedge (10) are fixed together by screws (11). The drive unit driving the chain (5) thus automatically effects the displacement of the trolleys (4) on the rail (3).

The wedge (10) is preferably made of a composite material which helps to reduce the weight of the trolleys and the resonant noise.

Figure 5:
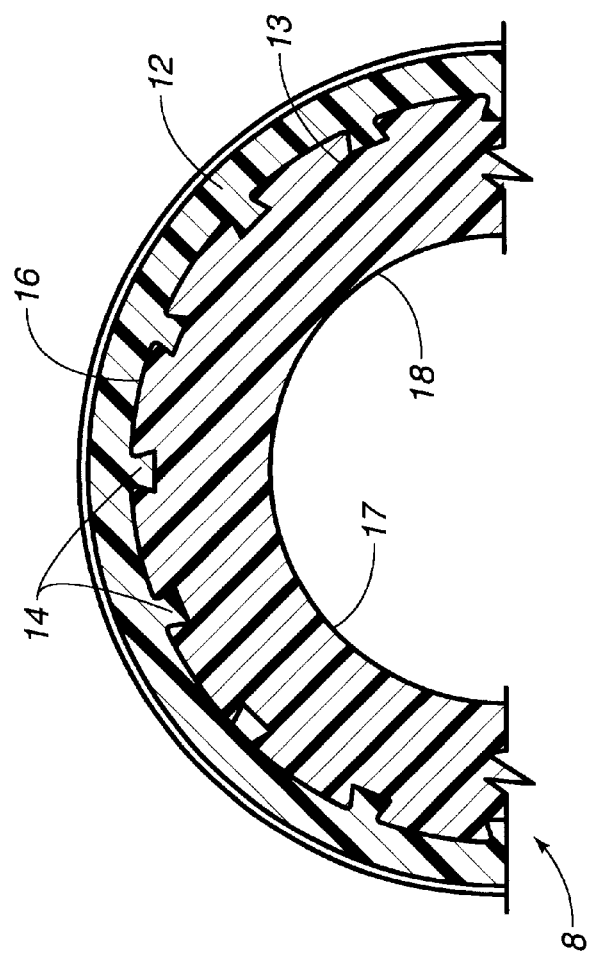
FIGS. 4 and 5 show means for connecting the elements forming the wheels.
Figure 4:
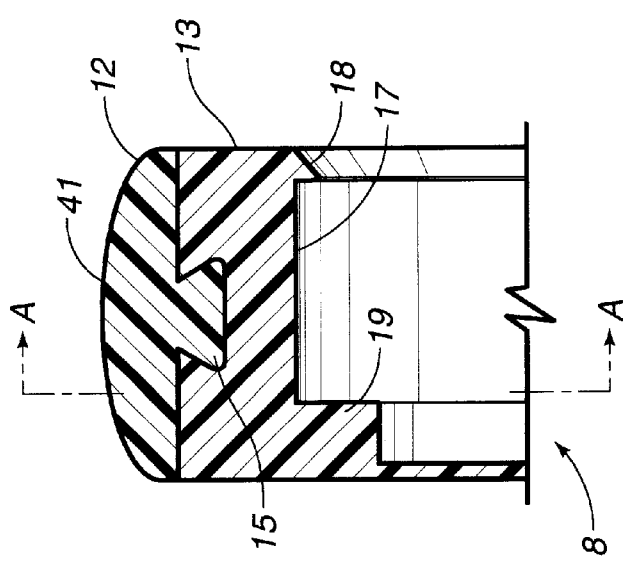

FIGS. 4 and 5 show the structure of the wheel (8) which includes of two parts (12, 13) both made of composite material and positively connected by means of fixing means (14, 15) which completely immobilize the two parts of the wheel relative to one another. The first part is referred to as the outer band (12) and the second as the central core (13) of the wheel. The use of composite materials for the design of the wheel (8) considerably reduces the noise due to contact of the wheels with the rail.

The composite material used for the outer band (12) is a much softer material than that used for the central core (13). The outer band is thus deformed easily, making it possible to absorb tensile and compressive stresses and shocks of the wheel on the rail in the event of variations in the speed of the drive unit (39) depending on whether or not it is situated in a work zone and in the event of a variation in the direction of the rail (3) depending on the position of the rail on the work site.

This also makes it possible to limit the friction of the wheels on the rail by virtue of better adhesion between the external surface (41) of the outer band (12) and the face (38) in contact with the rail. This thus reduces the wear of the wheels and the rail by making use of the features of the composite material used for the outer band (12), as a result of which lubrication of the rail can be dispensed with.

The composite material used for the outer band (12) can be thermoplastic injection-molded polyurethane, which has this feature desired for the outer band. Other materials can also fulfill this function. The outer band will have, a thickness of from five to eight millimeter for a diameter of the wheel (8) of eighty millimeter.

The composite material used for the central core (13) must make it possible to preserve a rigid structure in the center of the wheel (8). The central core (13) thus serves as a support for the connection between the wheel and the arm (9) and for the fixed connection (14, 15) between the outer band and the central core and thus prevents the wheel from being excessively deformed in order to preserve the connections between the different elements.

The means (14, 15) for producing the fixed connection between the outer band (12) and the central core (13) allow the outer band (12) to be immobilized in all directions relative to the central core (13). The outer band is thus deformed in all directions in the event of stresses and shocks on the rail without being able to become detached from the central core, thereby preserving the mechanical assembly of these two elements and therefore the integrity of the wheel.

The means for producing the fixed connection between the outer band (12) and the central core (13) is of a combination of dovetails (14) positioned axially on the contact periphery (16) between the two elements (12, 13) and a central dovetail (15) positioned radially over the entire contact periphery (16) between the two elements forming the wheel.

The number of dovetails (14) positioned axially is arbitrary and depends on the stresses and shocks that the outer band of the wheel is supposed to be able to withstand and on the dimensions of the wheel. E.g. the latter preferably includes sixteen dovetails positioned axially around the wheel in the case of a wheel having a diameter of eighty millimeter.

Figure 6:
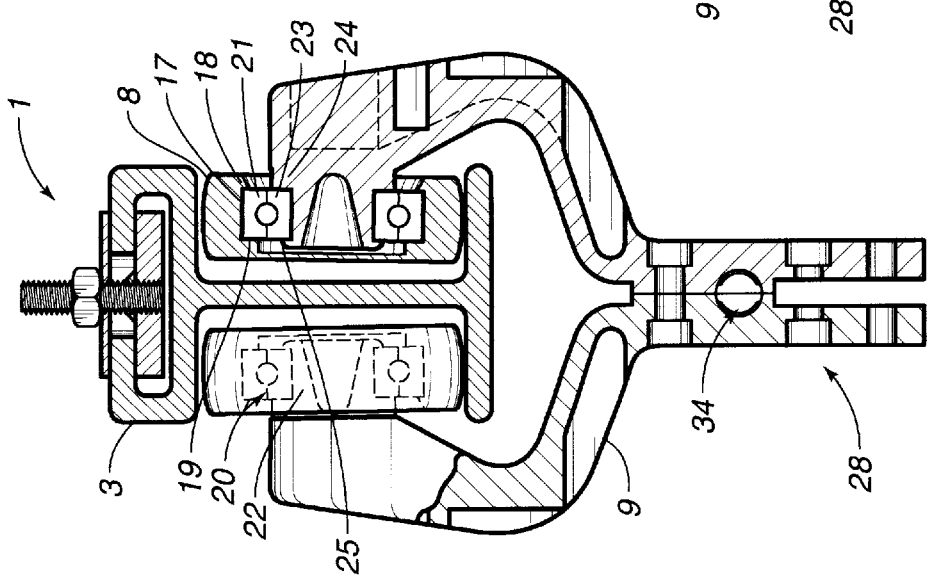

These dovetails (14) prevent rotation of the outer band (12) about the central core (13) and radial translation of the outer band relative to the central core. The central dovetail (15) for its part prevents axial translation of the outer band (12) relative to the central core. The outer band is thus immobilized in all directions relative to the central core. The wheel (8) is pivotally connected to the arm (9). To this end, as shown in FIG. 6, the central core (13) of the wheel is provided with an inner bore (17) provided with a shoulder (19) and a flange (18). The flange (18), in combination with the rigidity of the composite material used for the central core, allows the outer cage (21) of a roller bearing (20) to be clipped on tightly and completely immobilized.

In the same manner, the arm (9) is provided with a cylindrical part (22) provided with a shoulder (24) and a flange (25) for clipping the inner cage (23) of a ball bearing (20) and completely immobilising it.

The ball bearing (20) is thus clipped on to the wheel (8) and the arm (9), thereby locking the wheel in translation relative to the arm and thereby producing a pivoted connection between the two elements.

The ball bearing is preferably press-mounted on to the central core (13) of the wheel (8) and onto the cylindrical part (22) of the arm (9), given that the elements are tightly mounted.

The arms (9) of the trolleys are also made of composite material. The trolleys are thus made entirely of composite material, thereby completely eliminating contact between the steel elements, i.e. between the wheel (8) and the rail (3), and between the chain (5) and the arms (9) of the trolleys (4). This reduces the noise due to shocks of the elements in the event of variations in direction or variations in speed, this noise being quite considerable given the large number of trolleys (4) situated on the conveyor. The noise can thus be reduced by more than ten decibels compared to previous conveyors.

The use of composite material for the design of the arm (9) results in good elasticity for the latter, which is expanded and compressed easily. As the latter has to support the weight of the components to be transported and also that of the chain, the arms must therefore be stiffened in order to prevent excessive deformation thereof. To this end, the arms are provided on their lateral faces (26) with reinforcing lugs (27) for stiffening the structure of the arm. The reinforcing lugs (27) are positioned in the direction of the deformation of the arm (9), i.e. principally in the longitudinal direction of the arm.

This design of the arm therefore means that it is possible to damper tensile and compressive stresses on the wheels and on the arm itself, and shocks of the wheels on the rail and of the drive chain on the end (28) of the arm (9), the shock-absorbing effect of the arm (9) being obtained by a combination of the elasticity of the material and the stiffeners forming the reinforcing lugs (27).

The arms (9) of the trolleys thus also reduce the wear, noise and lubrication of the elements of the conveyor.

In order to facilitate the mounting of the trolleys (4) on the rail (3), the arms (9) of the trolley are provided at their ends (28) with hexagonal indentations (29) in which a nut is housed on the first arm of the trolley and a screw on the other arm. The screw preferably has a hollow hexagonal head so that the head (32) of the screw (31) can be placed in the hexagonal indentation (29) without blocking the latter in rotation.

The hexagonal indentation is made with slightly larger dimensions than those of the nut and the nut is therefore automatically blocked in the indentation when the screw is tightened, as a result of which there is no need to use an additional spanner to hold the nut when the screw is tightened in order to fix the two arms (9) and the wedge (10) of the trolleys (4).

The use of trolleys made of composite material except for the screwing systems removes quite a considerable weight from the conveyor, as the density of the composite material used for the trolleys is approximately 1.1, whereas that of steel is 7.8, and given the number of trolleys used on the very long-distance conveyor, this removes a very large load to be pulled by the chain and the drive unit.

It is thus possible to use less power and thus less expensive drive units. Similarly, the drive chain (5) is subjected to lower stresses which reduce friction and shocks in the inner link of the chain, thereby helping to reduce the wear of the latter.

The pins (7) of the drive chain (5) have a covering layer 7A of molybdenum bisulphide. This layer of molybdenum bisulphide increases the strength of the pins and reduces the coefficient of friction of the pins on the links (6) of the chain (5). This therefore increases the service life of the drive chain while reducing the lubrication of the latter.

The quantity of oil used for lubrication of the chain, by virtue of all the advantages provided by this invention, means that it is possible to use only fifteen to twenty per cent of the quantity of lubricating oil used previously and to effect this lubrication at a frequency of every two months. The operators can therefore control the maintenance operations for the conveyors more easily.

If the loads to be pulled are smaller in number and in weight, e.g. a total load of less than one hundred kilograms, the traction member used to draw the trolleys and the components is a flexible cable preferably made of KEVLAR™ and reinforced in its center with steel. The use of a cable (33) covered in a composite material thus completely eliminates lubrication and wear of the drive chain and also reduces the noise of the conveyor.

In this case, the trolleys are fixed to the traction cable by means of a gripping device (34) formed on the end (28) of the arm (9).

The gripping means (34) has of a cylindrical groove (35) and small sharp-edged flanges (36). The cylindrical groove (35) is made with a radius identical to that of the traction cable (33) so that it can easily take shape on the latter.

Figure 8:
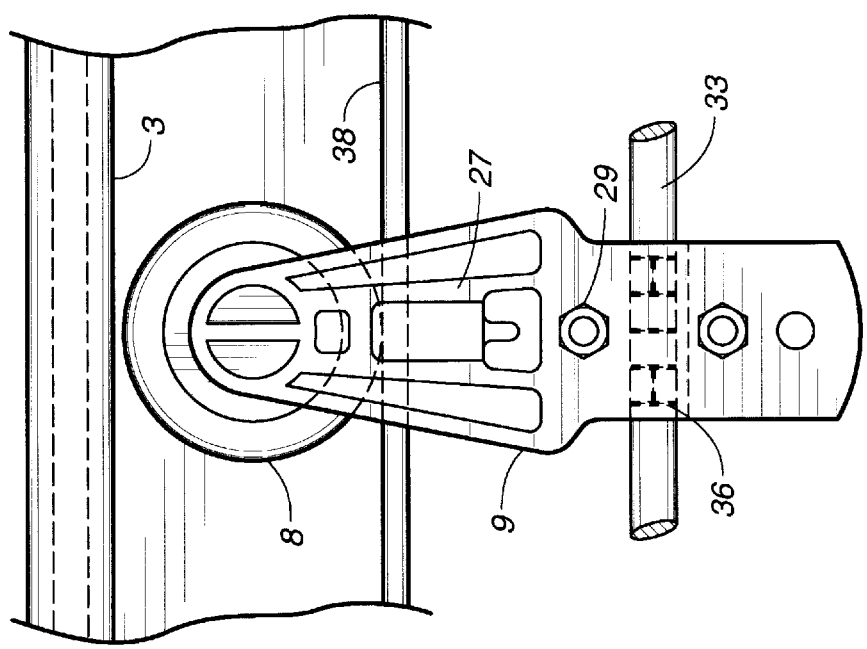
FIGS. 6 to 8 show the elements of the conveyor provided with a gripping device in order to use a traction cable.
Figure 7:
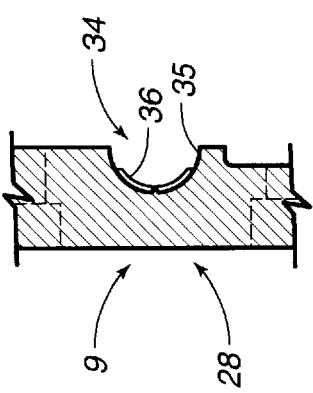

FIGS. 6 to 8 show that these grooves (35) are provided with small sharp-edged flanges (36) which, at the time of assembly and tightening of the two arms of the trolley, penetrate into the material of the cable and immobilize the trolley completely on the latter.

These small flanges (36) are preferably H-shaped so that, combined with the tightening, the two arms are locked in rotation and in translation relative to the cable. When using a traction cable (33), the tightening screws on the arms of the trolley are a minimum of two in number and are necessarily positioned one on either side of the groove (35) so as to distribute the tightening stresses during tightening and thereby to make the sharp-edged flanges penetrate into the cable and immobilize the trolleys relative to the cable.

On the other hand, in the case of a drive chain, the position of the tightening screws on the end (28) of the arm (9) can be varied as, once screwing has been effected, the arms (9) are locked in position in the link (6) of the chain by virtue of the rectangular groove (37) which is housed in the link, and by virtue of the wedge (10) which holds the two arms apart and thus holds the rectangular grooves (37) in position on the link (6).

This invention therefore sharply reduces noise on the work site by using a trolley of composite material which eliminates contact between the steel elements of the conveyor and reduces the problems of wear and corrosion.

In addition, it eliminates the need for lubrication on the rail and considerably reduces the lubrication of the drive chain, and even eliminates the need for lubrication when using a traction cable (33) covered in a composite material instead of a chain (5).

The elimination of lubrication and wear of the elements of the conveyor makes it easier to control the maintenance operations, thereby reducing the cost thereof. This invention also improves the quality of the working conditions on site by eliminating problems of corrosion, preventing the spillage of lubricating oils on to the products and onto employees and by sharply reducing the level of noise on site.

What is claimed is:

1. A conveyor for moving components to different work stations comprising:

a bearing and guide rail;

a traction member carried by said bearing and guide rail;

a drive means connected to said traction member for driving said traction member; and a plurality of trolleys movable on said bearing and guide rail, said plurality of trolleys suitable for receiving the components thereon, each of said plurality of trolleys comprising two wheels rollably positioned on said bearing and guide rail and two arms suitable for bearing the component to be conveyed thereby, each of said two wheels comprising a central core and an outer band, said central core and said outer band each being of a composite material, said outer band being of a softer composite material than the composite material of said central core, said outer band being deformable, said central core being rigid, said central core and said outer band being connected by fixing means for immobilizing said outer band relative to said central core, said fixing means being a plurality of dovetail connections formed axially around said central core and a central dovetail connection positioned radially on a periphery of said central core, said arms being of a composite material and having reinforcing lugs extending therealong, said wheels and said arms each having a flange retaining a ball bearing set therein, said ball bearing set pivotally connecting the wheels to respective arms.

2. The conveyor of claim 1, said traction member having a pin connected to a link affixed to trolley of said plurality of trolleys, said pin having a layer of molybdenum bisulphide thereover such that said link bears against said layer.

* * * * *